United States Patent [19]

Young et al.

[11] 4,451,847
[45] May 29, 1984

[54] AUTOMATIC STROBE/CAMERA CONTROL UNIT

[75] Inventors: Virgel J. Young, Picayune; Harry S. Myers, Jr., Long Beach, both of Miss.

[73] Assignee: The United States of America as represented by the Secretary of the Navy, Washington, D.C.

[21] Appl. No.: 389,521

[22] Filed: Jun. 17, 1982

[51] Int. Cl.³ .............................................. H04N 3/00
[52] U.S. Cl. ........................................ 358/99; 358/95; 354/64; 340/331; 340/825.57
[58] Field of Search ................... 358/209, 185, 95, 98, 358/99; 354/64; 340/825.06, 825.07, 825.22, 825.23, 825.52, 331

[56] References Cited

U.S. PATENT DOCUMENTS

| | | | |
|---|---|---|---|
| 2,633,783 | 4/1953 | Laval, Jr. | 354/64 |
| 2,880,798 | 4/1959 | Lohmeyer, Jr. | 354/64 |
| 3,305,633 | 2/1967 | Chernoch | 358/95 |
| 3,467,773 | 9/1969 | Heckman, Jr. | 358/95 |
| 3,738,248 | 6/1973 | Fish | 358/98 |
| 3,899,250 | 8/1975 | Bamberg | 358/95 |
| 3,902,803 | 9/1975 | Lego, Jr. | 358/99 |

Primary Examiner—Tommy P. Chin
Attorney, Agent, or Firm—R. F. Beers; F. I. Gray

[57] ABSTRACT

An automatic strobe/camera control unit for sensing when the TV/strobe power is on and the camera is enabled, and for automatically triggering the TV/strobe and camera at a preset time interval. An A.C. input voltage is divided to provide operator variable trigger pulse intervals and fixed 5 minute and 15 minute intervals for record annotation. A preset time interval is checked for error and controls a timer which provides a trigger pulse at the end of each interval. A decoder detects a command from a TV rack. An output keyclosure and/or frame counter is disabled or enabled depending upon the decoded command.

3 Claims, 3 Drawing Figures

AUTOMATIC STROBE/CAMERA CONTROL UNIT

BACKGROUND OF THE INVENTION

1. Field of the Invention

The present invention relates to control circuits, and more particularly to an automatic strobe/camera control unit for automatically controlling a remote TV strobe and camera in an oceanographic environment.

2. Description of the Prior Art

The prior method of firing a camera in an oceanographic environment is with a D.C. motor having a rheostat in series with it to allow changes in the motor speed. The shaft of the motor has a cam attached to the end. The cam actuates a microswitch which furnishes a key closure for camera trigger and also a key closure to increment an electromechanical counter.

For manual operation a remote switch is controlled by an operator. The operator has to physically verify when the TV/strobe power is on and the cameras enabled. Otherwise, the counter increments and trigger pulses are sent to the camera without a shot being taken, resulting in an erroneous indication of the number of camera shots actually taken.

SUMMARY OF THE INVENTION

Accordingly, the present invention provides an automatic strobe/camera control unit for sensing when the TV/strobe power is on and the camera is enabled, and for automatically triggering the TV/strobe and camera at a preset time interval. An A.C. input voltage is divided to provide operator variable trigger pulse intervals and fixed 5 minute and 15 minute pulse intervals for record annotation. A preset time interval is checked for error and controls a timer which provides a trigger pulse at the end of each interval. A decoder detects a command from a TV rack. An output keyclosure and/or frame counter is disabled or enabled depending upon the decoded command.

Therefore, it is an object of the present invention to provide an automatic strobe/camera control unit for automatically triggering a TV/strobe and a camera.

Another object of the present invention is to provide a means for counting the actual camera shots taken.

Yet another object of the present invention is to provide manual control of the TV/strobe and the camera at non-preselectable intervals.

Other objects, advantages and novel features will be apparent from the following detailed description when read in conjunction with the appended claims and attached drawing.

DESCRIPTION OF THE PREFERRED EMBODIMENT

Figure 1:
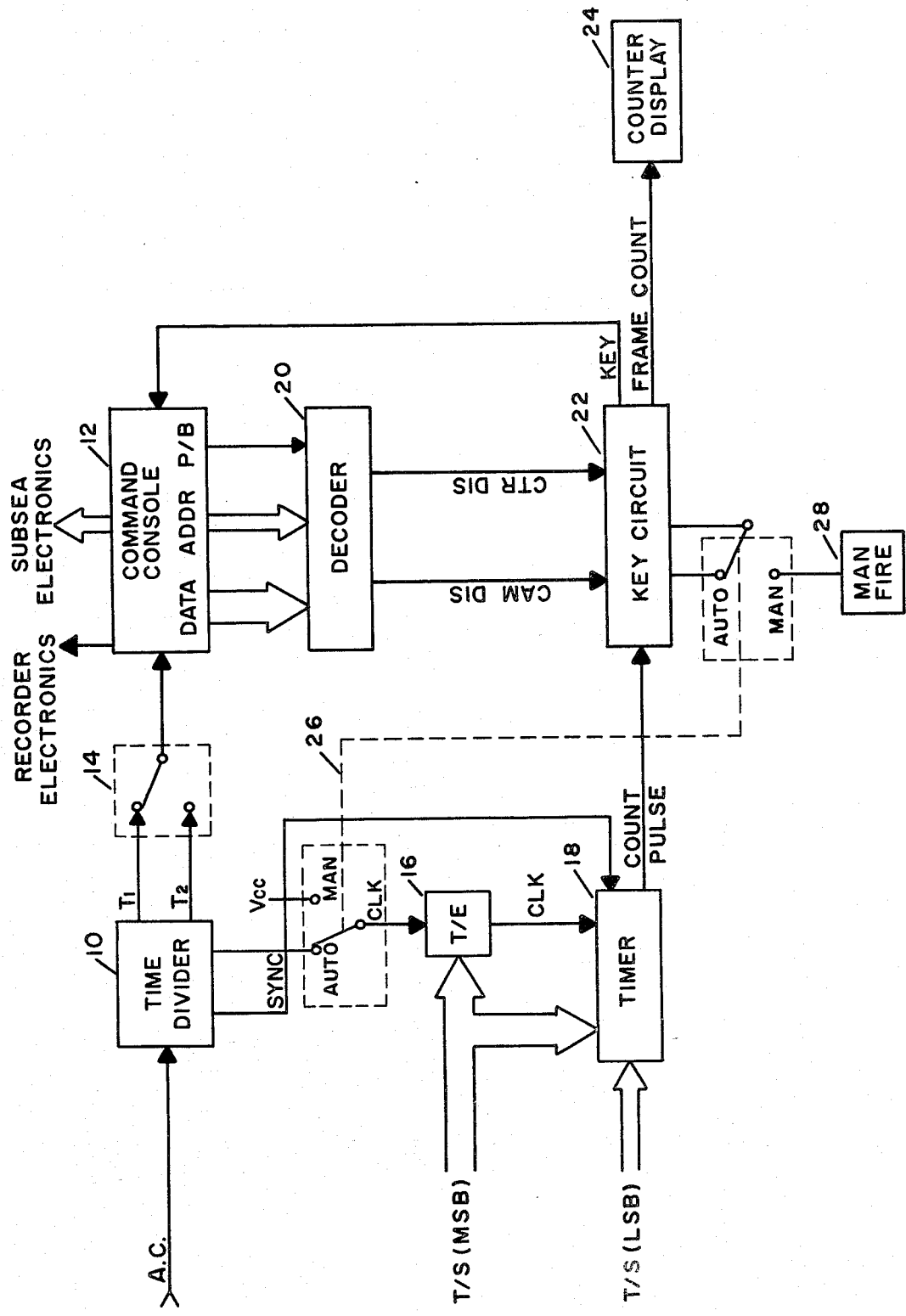
FIG. 1 is a clock diagram of an automatic strobe/camera control unit according to the present invention.

Referring to FIG. 1 a time divider circuit 10 receives an A.C. input and transforms it into a plurality of timing signals. A command console 12 interfaces with the subsea electronics to be controlled. A time switch 14 selects one of a plurality of long time intervals such as T1 and T2 to provide an automatic key closure for topside recorder electronics at a long interval periodic rate. A plurality of manually set switches T/S select a short time interval for rapid operation for use by the subsea electronics. Since the TV strobe lights in the subsea electronics require a certain minimum period of time to recharge after each discharge, a timing error circuit (T/E) 16 examines the most significant bits of the T/S setting to assure at least one of them is set. If none of the most significant bits are set, a timing error is indicated and the CLK signal from the time divider 10 is inhibited. If there is no timing error, the CLK signal is input to a timer 18 together with sync pulses from the time divider 10 and the T/S bits. The timer 18 counts the pulses of the CLK signal until the count equals the T/S setting, at which time a count pulse is output and the timer recycled to zero.

A decoder 20 receives address and data information from the command console 12. If the address is correct, the command data is decoded and transferred to the output lines upon receiving a pushbutton (P/B) transfer command from the command console 12. There are three basic commands: (1) TV strobe and camera off; (2) camera off and TV strobe on; and (3) TV strobe and camera on. A key circuit 22 receives the count pulses from the timer 18 and the camera disable and counter disable outputs from the decoder 20. The key circuit 22 outputs a key closure signal to the command console 12 for the subsea electronics when the TV strobe is enabled, and also increments a frame counter display 24 when the camera is enabled.

For manual operation an auto/manual switch 26 is placed in the manual position. The CLK signal to the timer 18 is replaced with a voltage so that no count pulses are output to the key circuit 22. A manual fire circuit 28, which may be a front panel pushbutton or a remote handheld switch, then provides the key closure signal to the command console.

Figure 2A:
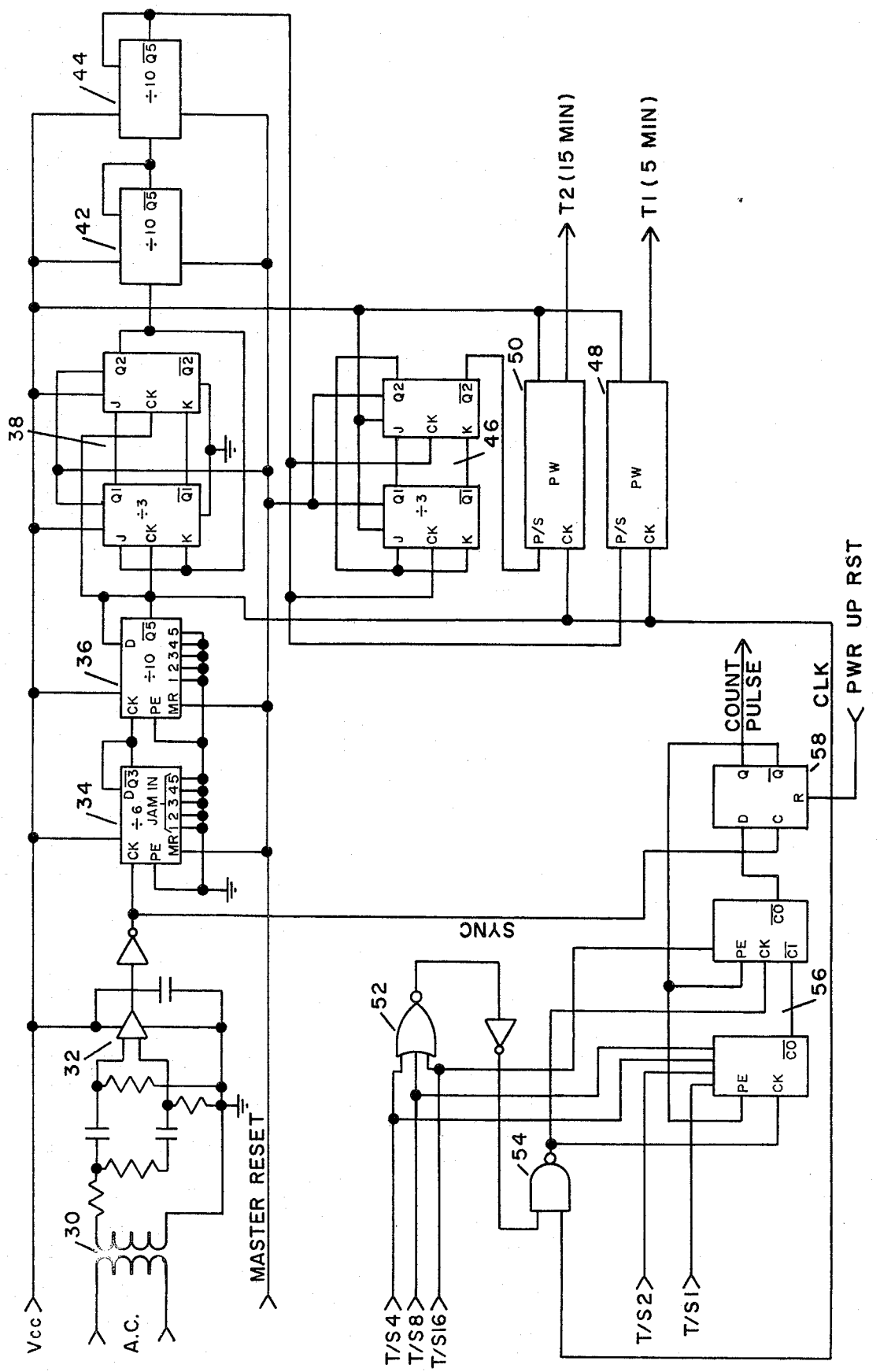
FIG. 2a,b is a schematic diagram of the automatic strobe/camera control unit.
Figure 2B:
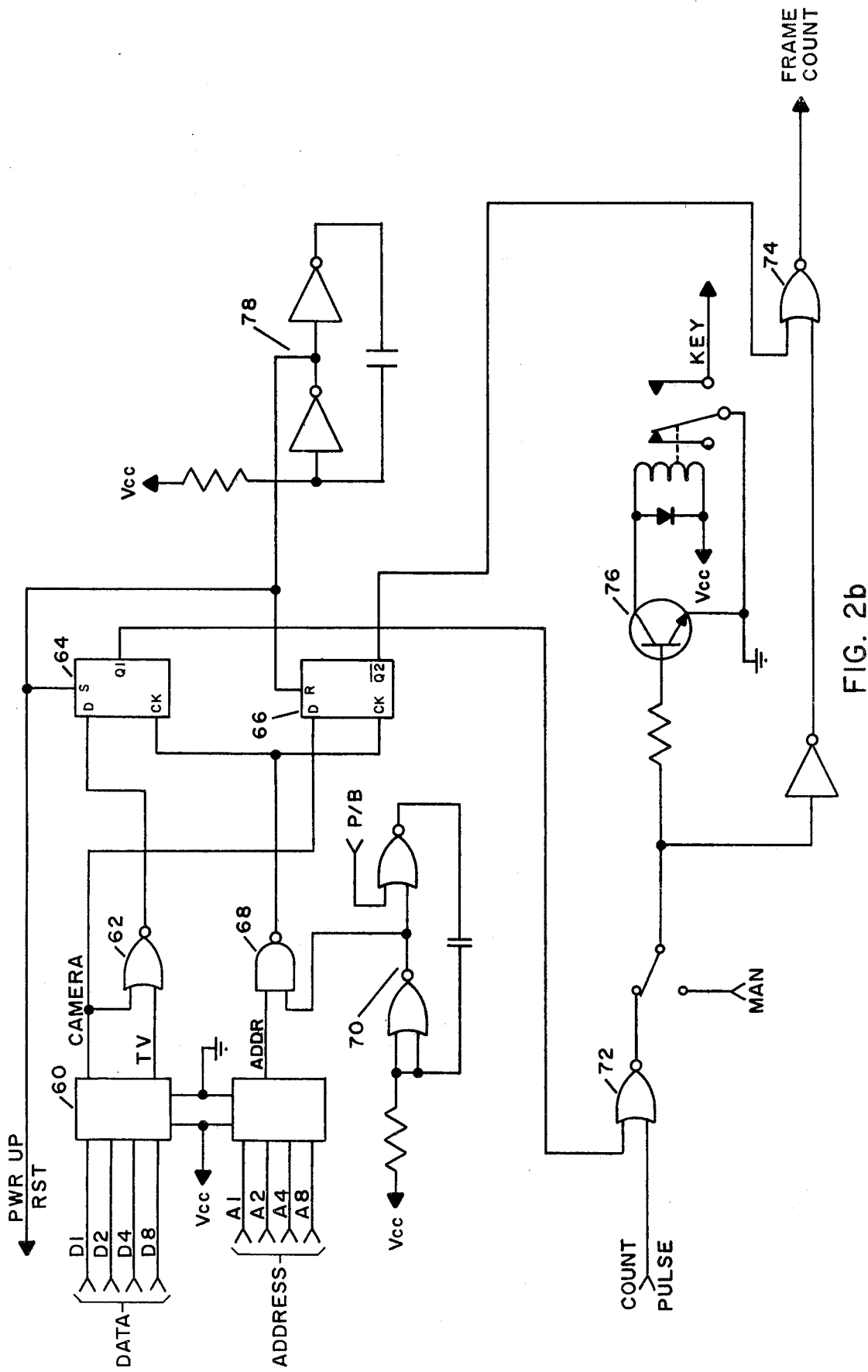

FIGS. 2a and 2b are a detailed schematic for the control unit. The A.C. input is transformed by a transformer 30 to an appropriate voltage level and input to a pulse shaping circuit 32 to produce a square wave sync output. The sync signal is divided by a ÷6 counter 34 and a ÷10 counter to produce a 1 Hz square wave CLK signal for a 60 cycle A.C. input. A pair of J-K flip-flops form a ÷3 counter 38 followed by two additional ÷10 counters 40,42 to produce a five minute square wave. A second pair of J-K flip-flops form another ÷3 counter 46 to produce a fifteen minute square wave from the five minute square wave. These two long interval square waves are input to respective pulse width circuits 48,50 to produce a 5 min pulse and a 15 min pulse of typically two seconds duration.

The timing error circuit 16 as shown in FIG. 2a provides for a minimum interval of 4 seconds, although the timing switches, T/S 1–T/S 16, can be set from 0 to 31 seconds. A NOR gate 52 examines the three most significant bits of the timing switches for at least one "1" bit. If there are no "1" bits, then NAND gate 54 is inhibited and the CLK signal is not passed through to the timer 18.

If there is no timing error, the CLK signal is applied to a comparator 56 which counts the CLK signal and outputs a negative signal to a D-type flip-flop 58 when the count equals the time switch setting. The output of the D-type flip-flop 58 is the Count Pulse.

The data and address information from the command console 12 are input into a decode logic circuit 60 shown in FIG. 2b which has three outputs: (1) camera on/off; (2) TV strobe on/off; and (3) address. The camera and TV outputs of the decode logic circuit 60 are input to a NOR gate 62. The output of the NOR gate 62 is input to a D-type flip-flop 64. The camera output of the decode logic circuit 60 is also input to a second D-type flip-flop 66. The address output of the decoder logic circuit 60 is input to a NAND gate 68 to enable the gate when the automatic strobe/camera control unit is addressed by the command console 12. A command transfer circuit 70 responds to the pushbutton (P/B) command from the command console 12 to provide a pulse to the NAND gate 68. The pulse is passed by the NAND gate 68 to the clock (CK) input of the D-type flip-flops 64,66 to transfer the command inputs to the outputs of the flip-flops.

If the camera and TV are off, the output of the first D-type flip-flop 64 is set to a "1" and inhibits a NOR gate 72 to which the count pulse from the timer 18 is input. If the TV is on but the camera is off, the first D-type flip-flop 64 enables the NOR gate 72 and the second D-type flip-flop 66 disables a second NOR gate 74 to prevent the count pulse from incrementing the frame counter display 24. The count pulse from NOR gate 72 energizes a key closure circuit 76 to provide a key pulse to the command console 12 to activate the subsea electroncs. A power-up/reset circuit 78 initializes the two D-type flip-flops 64,66 by setting the first flip-flop and resetting the second flip-flop to inhibit the NOR gates 72,74 until a command is transferred from the command console 12. The power-up/reset circuit 78 also resets the timer 18 to start the count from zero.

In operation the automatic strobe/camera control unit is turned on, the timer 18 is reset to zero, and the key and frame count outputs are inhibited. The time divider 10 provides 5/15 minute pulses to the key closure circuit in the command console 12 to energize the event mark for the recorder electronics. The decoder 20 is addressed from the command console 12, and the command data indicating the status of the TV strobe and camera is input to the decoder. Upon receipt of the pushbutton command the decoder 20 enables the key pulse and frame counter pulse as appropriate. The key pulse occurs at regular intervals according to the setting of the timing switches (T/S) so long as such interval is within the limits allowed by the timing error circuit 16.

For manual operation the auto/manual switch 26 is switched to manual. The count pulse from the timer 18 is inhibited, and a manual pushbutton or the like provides a key pulse to the command console to energize the subsea electronics. The key pulse inhibit from the decoder 20 is bypassed, but the frame count inhibit is still active. Suitable LED displays provide the operator with status information such as timing error, power on/off, auto/manual control, camera enable and TV enable. Also manual reset buttons are provided to reset the time divider 10 and the frame counter display 24.

Thus, the present invention provides an automatic strobe/camera control unit which provides an automatic key closure signal at preset time intervals for subsea electronics to trigger remote TV strobe and camera units while keeping track of the number of camera shots actually taken. Optional manual control provides operator ability to activate the TV strobe and camera units at irregular intervals.

What is claimed is:

1. An automatic control unit for operating remote apparatus comprising:

mean for generating a plurality of timing signals from an a. c. input signal, said timing signals including a clock pulse signal and a long interval pulse for external use;

a timer to which said clock pulse signal from said generating means is input, said timer having means for counting the pulses of said clock pulse signal and means for comparing the resulting count with a preselected count equivalent to a predetermined rate for providing output pulses at said predetermined rate;

means for inhibiting said clock pulse signal from said generating means from being input to said timer when said preselected count is less than a predetermined minimum value;

a decoder to receive command data, said decoder outputting a command function which is determined by said command data;

a key circuit controlled by said command function from said decoder, said key circuit providing a key closure signal to operate said remote apparatus and/or a frame count pulse for each of said output pulses depending upon said command function; and a counter display to count and display said frame count pulses from said key circuit.

2. An automatic control unit as recited in claim 1 wherein said generating means comprises a pulse shaping circuit to convert said a.c. input signal into a square wave output;

a plurality of counters to divide said square wave output into said plurality of timing signals; and a pulse width circuit to produce said long interval pulse from said timing signals.

3. An automatic control unit as recited in claim 2 wherein said inhibiting means comprises:

a first gate to examine the most significant bits of said preselected count; and a second gate which is enabled by the output of said first gate to pass said clock pulse signal to said timer when at least one of said most significant bits is set.

* * * * *